(12) United States Patent
Oren-Chazon

(10) Patent No.: US 6,727,417 B2
(45) Date of Patent: Apr. 27, 2004

(54) COMPUTERIZED MUSIC TEACHING INSTRUMENT

(76) Inventor: Dorly Oren-Chazon, 40/27 Burln Street, Tel-Aviv 69364 (IL)

( * ) Notice: Subject to any disclaimer, the term of this patent is extended or adjusted under 35 U.S.C. 154(b) by 0 days.

(21) Appl. No.: 10/084,655

(22) Filed: Feb. 28, 2002

(65) Prior Publication Data

US 2003/0159564 A1 Aug. 28, 2003

(51) Int. Cl.$^7$ .................. G09B 5/06; G09B 15/00
(52) U.S. Cl. .................. 84/470 R; 84/615; 84/478
(58) Field of Search .................. 84/470 R, 477 R, 84/478, 479 A

(56) References Cited

U.S. PATENT DOCUMENTS

| | | |
|---|---|---|
| 4,114,501 A | 9/1978 | Tanaka |
| 4,704,682 A | 11/1987 | Clynes |
| 4,763,257 A | 8/1988 | Clynes |
| 5,496,179 A * | 3/1996 | Hoffman ............... 84/479 A X |
| 5,540,132 A | 7/1996 | Hale |
| 5,545,071 A | 8/1996 | Shiraishi |
| 6,215,057 B1 | 4/2001 | Oren-Chazon |
| 6,225,546 B1 * | 5/2001 | Kraft et al. ............... 84/609 |
| 6,337,434 B2 * | 1/2002 | Oren-Chazon ............... 84/478 |
| 6,388,181 B2 * | 5/2002 | Moe ............... 84/477 R |

* cited by examiner

*Primary Examiner*—Robert Nappi
*Assistant Examiner*—David S Warren
(74) *Attorney, Agent, or Firm*—Browdy and Neimark, P.L.L.C.

(57) ABSTRACT

A computerized music teaching instrument including a computer provided with a sound system capable of reproducing the tones of a music scale stored in a tone base, and a video screen adapted to exhibit an image selected from a series thereof stored in a data base. Each image exhibits a virtual keyboard having a row of numbered keys representing the respective tones in a musical scale, behind which is a row of puppets or progressively greater height, all puppets being shown in a reclining state except the puppet corresponding to the key in the keyboard shown in a depressed and activated state, as if actually pressed by the finger of a player. Associated with the computer is a remote controller provided with a keypad having an array of numbered switches corresponding to the keyboard keys and operating in conjunction with a digitizer whereby when a player depresses a keypad switch, the digitizer then generates a binary signal representing the number of the depressed key.

15 Claims, 6 Drawing Sheets

| | $R_1$ | $R_2$ | $R_3$ | $R_4$ | $R_5$ |
|---|---|---|---|---|---|
| | Notes | Letters | Numbers | Colors | Sizes |
| | MI | E | 3 | Light Green | ▨ |
| | RE | D | 2 | Light Green | ▨ |
| | DO | C | 1 | Red | ▨ |
| | TI | B | 7 | Purple | ▨ |
| | LA | A | 6 | Orange | ▨ |
| | SOL | G | 5 | Blue | ▨ |
| | FA | F | 4 | Yellow | ▨ |
| | MI | E | 3 | Green | ▨ |
| | RE | D | 2 | Light Green | ▨ |
| | DO | C | 1 | Red | ▨ |

FIG. 7

COMPUTERIZED MUSIC TEACHING INSTRUMENT

BACKGROUND OF THE INVENTION

1. Field of the Invention

The present invention relates generally to a music interactive toy and/or educational instrument. More particularly, the present invention relates to such toys and/or educational instruments for teaching people of all ages to recognize, by sound, name and symbol the musical notes of the scale.

2. Description of the Prior Art

Music plays a major role in the lives of most people. Music is often referred to as a universal language, allowing people who do not speak the same language to nevertheless communicate with each other. However, while children are taught the basics of a spoken language (a, b, c, . . . ) and a numerical language (1, 2, 3, . . . ), very little emphasis is placed on the musical language (do, re, mi, . . . ). In fact even musicians, though skilled at their particular intent sometimes have little knowledge concerning the musical language. Many musicians learn to play by sound without ever associating musical notes with their given names ("do", "re", "mi", "fa", "sol", "la", and "ti").

But most people do not have the natural born talent to learn how to play an instrument without knowing the musical language. Thus, it would be desirable to begin teaching the musical scale and the names of the musical notes (i.e., "do", "re", "mi", "fa", "sol", "la", and "ti") to children at a relatively young age (even as young as under two years old), when their minds are most receptive to new information. However, because many children have relatively short attention spans, a method of teaching the musical scale to children to be effective must hold their attention while simultaneously educating them.

A number of systems and aids have been proposed for teaching the musical scale to children. One such system is disclosed in U.S. Pat. No. 4,114,501 to Tanaka. This system includes plural dolls, each having a flexible bellows and a uniquely configured air chamber and passageway to produce a unique noise in a particular pitch or tone. This system however, provides no means for varying the sound output by the dolls to cater to different children's interests in an effort to capture and hold their attention.

A similar device is disclosed in U.S. Pat. No. 5,540,132 to Hale. It includes plural puppet characters that incorporate tonal devices such as battery powered electronic devices that emit a sound in a tone corresponding to that of the musical note with which the puppet character is associated. The tonal device which is housed inside the puppet includes a pressure sensitive switch to activate it. This device also suffers from the shortcoming that there is no way to change the output format of the sound being generated depending on the person using the device. Also of prior art interest is the Shiraishi U.S. Pat. No. 5,545,071 in which figurines are associated with the keys of a keyboard.

It is evident from the foregoing that there continues to exist a need for an improved music teaching device for teaching individuals, particularly children to distinguish musical notes by sound, sight and/or name simultaneously. Furthermore, there exists a need for such a music teaching device that is adaptable to the particular user thereof and to his or her interests. There is a need to understand relative changes in pitch between the notes by visualizing these changes in a graduated increase in size of the colored dolls or miniature figures, corresponding to each note. The present invention addresses these and other needs. Of prior art interest is my U.S. Pat. No. 6,215,057 which discloses a music teaching instrument which seeks to satisfy these needs, entitled "Sound Generating Educational Toy and Teaching Device".

In our U.S. Pat. No. 6,215,057 there is disclosed a music teaching instrument adapted to teach pre-school children the notes of a musical scale so that the notes will be remembered. The instrument includes a sound system having a memory in which is stored audible tones of the musical scale, and means to reproduce a tone extracted from the memory so that it can be heard by the player. A keyboard is provided having a row of keys corresponding to the tones of the scale. Switching means are associated wit the keys and are coupled to the sound system whereby when a key in the row is actuated by the player, a corresponding tone is then reproduced.

A row of puppets is placed behind the row of keys, each puppet being normally inactive and in registration with a respective key. A mechanism responsive to actuation of a key serve to activate the corresponding puppet, whereby the puppet then appears to be voicing the tone being reproduced. A child who plays this instrument will not only hear the tones of a musical scale as he manipulates the keys but he will also be made to recognize that the pitch of successive tones increases progressively as one goes up the scale. This progression is expressed alphabetically by letters and by numerical counterparts to the respective tones, as well as by changes in color. These changes are also indicated by symbols for the tones. The collective effect of these changes is to dramatize tonal distinction and in doing so to implant them in the player's memory.

The instrument disclosed in my above-identified prior patent is a unitary, self sufficient portable apparatus which operates independently of external or auxiliary devices. Consequently, the instrument can be placed at any site that suits the convenience of its player. In effect the instrument is a module that packages a sound system associated with a keyboard to produce tones that depend on which keys are being actuated, a row of puppets behind the row of keys being key-actuated to selectively raise the puppets, the puppet which is raised se to voice the tone the being reproduced.

A computerized music teaching instrument in accordance with the invention virtually carries out functions actually performed by the portable instrument disclosed in my prior U.S. Pat. No. 6,215,057, but it does so without any mechanism for these mechanisms are simulated by the computer.

Of prior art interest are the U.S. Pat. Nos. 4,763,257 and 4,704,682 to Manfred Clynes, both entitled "Computerized System for Imparting an Expressive Microstructure to Successive Notes in a Musical Scale".

In the system disclosed in the Clynes patents, the notation of a musical score is fed into a computer having a sound card in which is stored the tones of the musical scale, the computer operating in conjunction with a sound system capable of reproducing the sounds stored in the card. In operation, each note from a music score entered into the computer is dig d to produce a binary signal which acts to extract from the sound card the corresponding tone whereby the successive notes of the score entered into the computer are reproduced. Thus a composer of music, at completing his score, can hear his composition performed without having to engage musicians for this purpose.

SUMMARY OF THE INVENTION

In view of the foregoing, an object of this invention is to provide a music teaching system which exploits the capability of a computer so that it affords a virtual image of an instrument for playing the tones of a music scale and functions in all respects in the manner of the music teaching instrument disclosed in my above-identified U.S. patent.

More particularly, an object of this invention is to provide a computerized music teaching system in which the computer is associated with a remote controller having a keyboard which simulates the keyboard of a piano, each of whose keys when depressed, produces a switching action that controls the computer to cause it to generate a tone whose number corresponds to the number of the key.

Briefly stated, in a computerized music teaching instrument in accordance with the invention, the computer is provided with a sound system capable of reproducing the tones of a music scale stored in a tone base, and a video screen adapted to exhibit an image of the instrument selected from a series thereof. Each of these images exhibits a keyboard having a row of numbered keys, each key representing a respective tone in a musical scale, behind which is a row of humanoid figures or puppets of progressively greater height, all puppets being shown in a reclining state except the puppet corresponding to the key in the keyboard shown in a depressed activated state, as if pressed by the finger of a player.

Associated with the computer is a remote controller provided with a keypad having an array of numbered switches corresponding to the keys on the keyboard image and operating in conjunction with a digitizer whereby when a switch on the keypad is depressed by a player, the digitizer then generates a binary signal representing the number of the depressed key.

The digital signal from the digitizer is entered in the computer and it acts to extract from the tone base the particular tone corresponding to the number represented by the signal. It also extracts from the data base of the computer and displays on the screen the image showing the depressed key on the keyboard corresponding to the depressed switch on the controller keypad. In the displayed image, the corresponding puppet is seen in an erect state, the sound of the tone then being reproduced by the sound system. The player who operates the controller produces and hears a tone whose position in a music scale depends on the number of the key on the keypad that is depressed by the player.

BRIEF DESCRIPTION OF THE DRAWINGS

For a better understanding of the invention as well as other features and objects thereof, reference is made to the annexed drawings wherein:

FIG. 7 is a table showing the different manifestations of a musical scale produced by the teaching device;

DETAILED DESCRIPTION OF THE INVENTION

Figure 1:
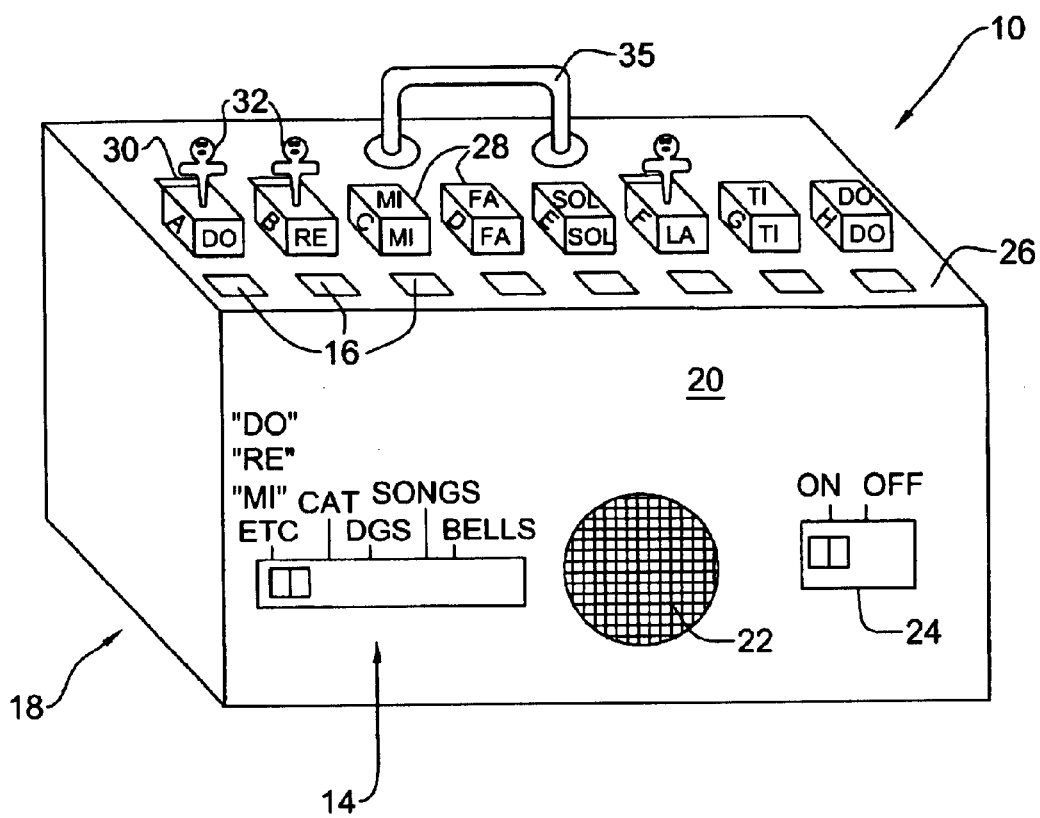
FIG. 1 is a perspective view of a preferred embodiment of the music teaching device of the present invention.
Figure 2:
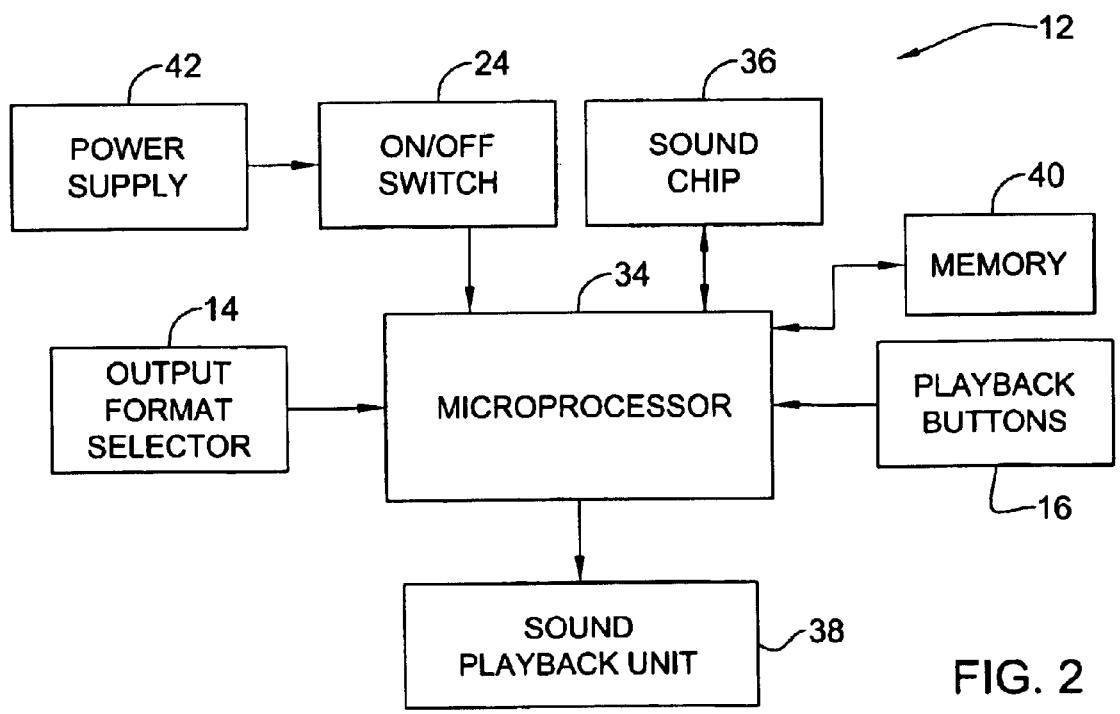
FIG. 2 is a block diagram of electronic components included in the music teaching device of FIG. 1.

In the following description, like reference numerals are used to refer to like or corresponding elements in the different figures of the drawings. Referring now to the drawings, and in particular to FIGS. 1 and 2, there is shown a music teaching device 10 in accordance with a preferred embodiment of the present invention which includes one or more sound generating devices 12, an output format selector switch 14, and plural playback buttons or switches 16. Thus, a user may select a desired output format arid sequentially depress one or more of the buttons in order to generate one or more sounds in the corresponding pitches and in the selected output format.

Music teaching device 10 includes a generally rectangular housing 18 having a front face 20 on which are mounted the output format selector switch 14, a speaker 22, and an on-off switch 24. The on-off switch is operative to selectively empower the music teaching device, as described in greater detail below. The housing further includes a top wall 26 in which is mounted the plural playback buttons 16. A handle 35 is connected to top wall 26 to pot the device 10 which is portable to be carried by a user. The top wall is filer formed with plural receptacles (not shown), each of which is configured to releasably engage a respective box 28 formed with a hinged lid 30, as described in greater detail below.

Output format selector 14 is preferably in the form of a slide switch (FIG. 1) with plural settings corresponding to different outputs. As shown in FIG. 1 as examples of possible output formats, are settings corresponding to the names of the notes ("do", "re", "mi", "fa", "sol", "la", and "ti"), a cat's meow, a dog's bark, a particular song, or a musical instrument, such as, for example, bells. It will be apparent that the settings could correspond with any desired output. For example, the sound output could be the sound of a piano or other instruments. The notes could sound as "do", "re", "mi", "fa", "sol", "la", and "ti" or as "A", "B", "C", "D", "E", "F" and "G" as the notes are currently taught in the United States.

Additionally, the sound can be emitted, for example, in the legato or staccato style. Additional rhythms, as in conventional synthesizers, can be played. And in place of a slide switch, a knob with multiple settings may be used. Movement of the slide switch to one of the settings results in the generation of a corresponding signal, as described in greater detail below.

Each of buttons 16 correspond to one of the boxes 28, such that depression of one of the buttons causes the lid 30 of that box to open, allowing a doll 32 to project outwardly therefrom. Depression of the button also results in the generation of an identifiable signal transmitted to the sod generating device 12. For example, if switch 14 is aligned with the "song" output, when a user depresses a button, that figurine will sound out the fit word in the song in the particular note assigned to that button/doll. Thereafter, the next button that is depressed will result in the next word of the song being sounded in that second depressed button's assigned note. In this manner, the player of the instrument may compose his or her own music. Also the device may include a recording device to record the music composed by the user so that the recorded music can be played back.

Each of boxes 28 includes indicia printed thereon, preferably in the form of the names of the notes of the scale (i.e., "do", "re", "mi", etc.) on both the side and top of the box. The boxes are arranged from left to right, as shown in FIG. 1, in an order running from the lowest note ("do") to the highest note ("ti"). Each of dolls 32 has a different height, the shortest doll being housed in the "do" box, and the tallest in the "ti" box. The eighth box is for the note "do" from the next scale. In addition, each doll is preferably colored with a different color whereby the user associates the dolls with the different musical notes. The higher the note, the larger or higher the doll. Preferably, each doll is decorated in a particular color, with the three most dominant notes "do", "fa" and "sol" being represented by the three most dominant colors; yellow, blue and red, respectively. The remaining notes can be represented by sequentially less dominant colors. For example, "re", "mi", "la" and "ti" are preferably represented by dark green, light green, orange and purple. "Do" from the next scale or octave would be light blue.

Referring now to FIG. 2, there is shown a block diagram of the electronic components included in the sound generating device 12. The sound generating device includes a microprocessor 34, a sound bite storage device 36, preferably in the form of a sound chip, a sound playback unit 38, and a memory 40. The special features of the sound generating devices are implemented, in part, by software programs stored in the memory 40. The software programs are stored in one or more preselected data files and are accessible by the processor, the function of which is described in greater detail in connection with FIG. 3. The memory preferably takes the form of a non-volatile memory device, such as a magnetic or optical storage unit or the like.

Figure 5:
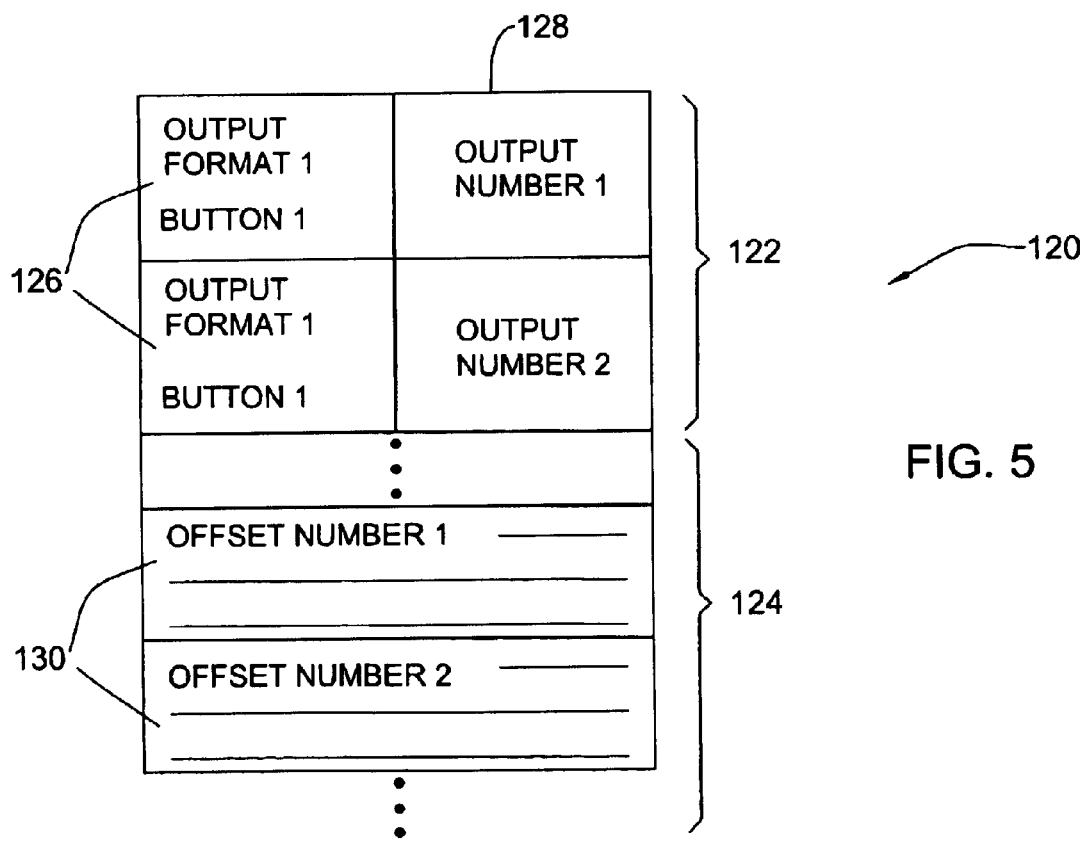
FIG. 5 is a schematic diagram of a file storage architecture including an association table according to the present invention.

The sound chip 36, of well known design, includes a standard digital memory unit (not shown) and is controlled by the processor 34 to access and retrieve a particular sound bite data file stored in the memory unit at a location indicated by an entry in an association table included in the memory of the sound chip (FIG. 5). Thus, the proper sound bite may be obtained by referring to the association table and looking for the user-selected parameters. Alternatively, a sound card or other similar device could be utilized in place of the sound chip.

The sound playback unit 38 includes the speaker 22 mounted on the front face 20 of the housing 18, an amplifier, and a digital-to-analog converter to convert the digital sound data retrieved from the sound chip 36 into an analog signal. The amplifier then amplifies the converted analog signal and transmits the amplified analog signal to the speaker for playback. The on-off switch 24 is operative to selectively transmit power from a power supply 42 to the microprocessor 34. The power supply is preferably a battery, so that the instrument is portable and need not be plugged into a power link.

Figure 3:
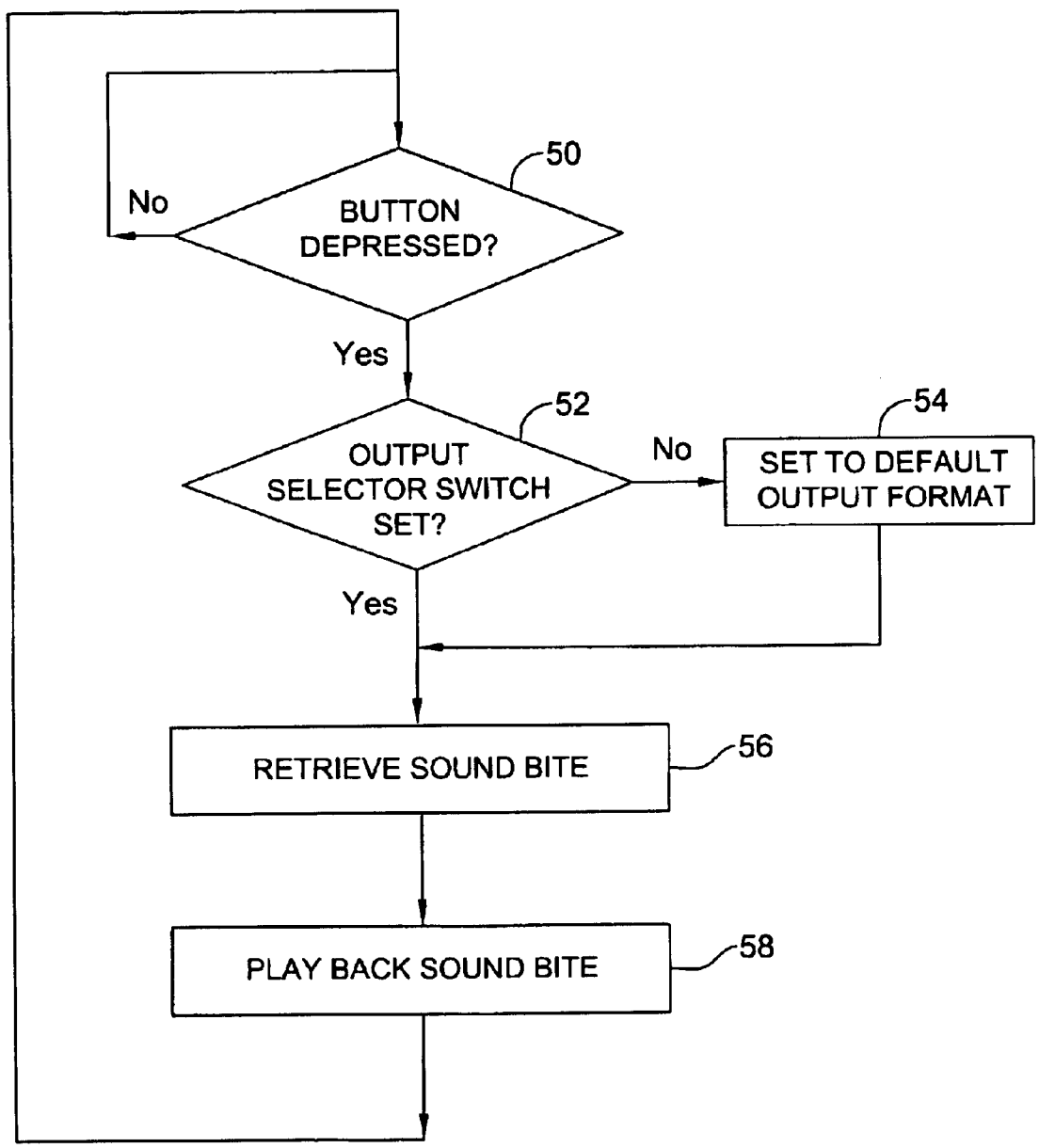
FIG. 3 is a flow chart of the operation of the music teaching device of FIG. 1.

Referring now to FIG. 3, the operation of the music teaching device 10 will be described in greater detail. After the device has been actuated by shifting on-off switch 24 to its "on" position, processor 34 waits for one of the playback buttons 16 to be depressed at query block 50. Once one of these playbacks buttons has been depressed, operation flows to query block 52, and the processor determines whether the output format selector 14 has been set to a particular output format.

If the selector has been set to an output format, then operation flows to function block 56, and the processor retrieves from sound chip 36 the corresponding sound bite in the desired output format and pitch. If not, then at function block 54 a default output format is selected, and operation flows to function block 56 where the processor retrieves the corresponding sound bite in the default output format. The default out format could be the actual name of the note in the note's pitch, or any other output.

The sound bite retrieval is preferably accomplished by utilizing the association table, with the processor matching the data corresponding to the selected output format and particular depressed button with the data in the association table to determine the location of the corresponding sound bite. The processor then retrieves that sound bite and transmits the digital sound bite data to the playback unit 38. At function block 58, the retrieved sound bite is played back by the sound playback unit. The digital sound bite data is converted to an analog signal, amplified, and played through the speaker 22. After the sound bite has been played back, operation flows back to query block 50 to await depression of another one of the buttons 16.

It will be apparent that the music teaching device 10 of the present invention could take many different forms. For example, the device could be embodied in a personal computer, with the computer's microprocessor being programmed to perform the routine described above in connection with FIG. 3. The computer's keyboard or mouse could be used to select the output format and the particular note to be audibly played back. The digital sound bites could be stored in the computer's memory or on a disk that is accessed by the microprocessor through its disk drive.

In a preferred embodiment, each doll 32 includes a separate playback unit 38 and sound chip 36 and is removable from its box 28. Thus, the dolls can be removed from the housing and can still generate notes in their respective pitches upon actuation of a switch located on each doll.

Figure 4:
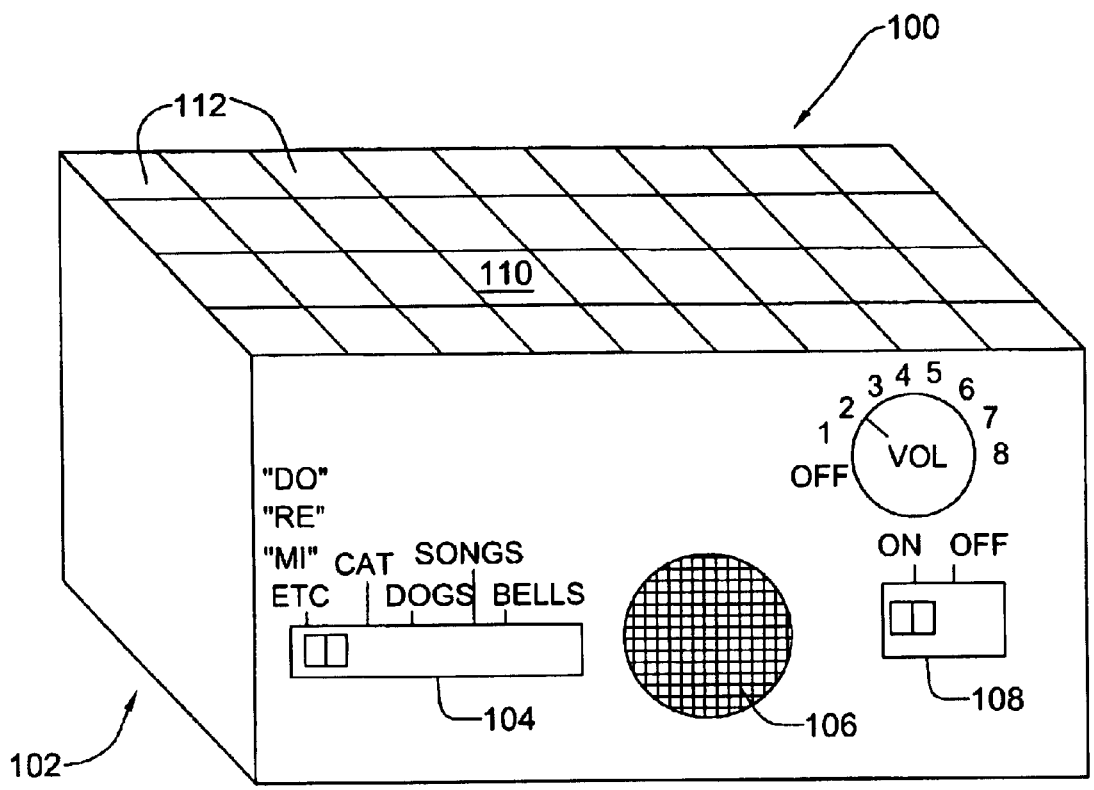
FIG. 4 is a perspective view of an alternative embodiment of the music teaching device of the present invention.

Referring now to FIG. 4, there is shown an alternative embodiment of the music teaching device 100. The device 100 includes a housing 102, an output format selector 104, speaker 106, and an on-off switch 108, all being identical to the components included in the device 10 shown in FIG. 1. In place of buttons 16, boxes 28, and dolls 32, device 100 includes a top surface 110 partitioned into plural discrete segments 112, each of which corresponds to a particular note. The device is preferably provided with eight columns corresponding to the seven notes plus the first note "do" being repeated in the next scale), and includes plural rows corresponding to the different octaves of the major scale. Each segment is sensitive to touch (i.e., it either comprises a depressible switch or a touch-sensitive display), such that selection of one of the segments causes the device to audibly generate the corresponding sound bite, as described above.

FIG. 5 shows a file storage architecture 120 comprising an association table section 122 and a sound data storage section 124 used by the microprocessor 34, as described above, to locate the proper sound bite. The association table section 122 comprises a series of address lines 126, each of which links an output format and button with a corresponding sound bite by means of an offset address designator 128 which points to a predefined start site in the remainder of the memory where the corresponding sound bite data is stored. Thus the microprocessor 34 simply accesses the association table and searches for the matching output format and button data and, once found, determines the offset location for the desired sound bite. The sound data storage section 124 comprises a series of memory blocks 130, each of which stores sound information comprising a sound bite.

From the foregoing, it will be apparent that music teaching device 10 provides an educational, interactive device for teaching a user to recognize a note by sound, and to associate the note with the note's name. In addition, the music teaching device provides plural output formats to accommodate different users interests.

The present invention is not intended to be limited by the illustrative examples set forth herein. For example, a user can test him or herself by utilizing the device in a "pick the note" mode. The device can randomly sound an audible note, and, thereafter, the user must pick the correct doll or other button or switch that corresponds to the sounded note. In this manner, the user learns to identify notes by sound and by association to a particular size and/or color of a doll. The device can include a record feature so that the sound bites played by the user can be recorded and played back for repeated entertainment.

The device can also be operated by remote control, including remote operation of the dolls regardless of whether they are in or out of the base. Further, the device can be input as a computer program or game so that the dolls are illustrated on the screen. The dolls can be actuated by clicking on the doll to bear the preselected output format. Thus, the mouse of the computer can be the playback button and can be used to select the output format. Further, while only one octave has been illustrated for the device, it is clear that two, three or more octaves of notes may be utilized by the device in accordance with the present invention. Additionally, the device may play half-notes.

Music-Teaching Instrument for Pre-School Children

The capacity of the human brain to remember in detail for a prolonged period depends on its ability to place in storage, to process and to retrieve information in whatever form it is entered into the brain. An individual can best understand and remember information presented to him metaphorically as well as literally; that is by way of analogy and counterparts.

An eminent thinker is reported as saying that "Man's first great invention was the wheel—his second, the Metaphor". Metaphor is a vital aid to memory and human communication. Thus it is fair easier to appreciate and remember the shape of an object when described as being "pear-shaped" than when described in the language of geometry.

Our concern in the present invention is with teaching the notes of the musical scale to a pre-school child, and to give an example of where metaphor comes into plays we shall assume that a kindergarten teacher wishes to teach the child the word BIG and what it means. This can best be done by the teacher in the following manner:

a) By writing the letters of the word BIG on a blackboard.
 b) By vocally pronouncing the word BIG so that the child knows how it sounds
 c) By demon how BIG differ from SMALL by making a loud sound and then a soft sound.
 d) By showing the child an Apple (Big) next to a Cherry (Little).

A child in this situation will implant in his memory the vocal and visual aspects of the work BIG and in doing so he is not likely ever to forget this word and its meaning.

UK Patent GB 2112990 takes a similar multifaceted approach toward teaching a child the notes of the musical scale, knowledge which is a precursor to learning how to play music on an instrument. The educational toy disclosed in this British patent, is adapted to teach a child the notes of the musical scale and the counterparts thereto in terms of alphabetic letters and Arabic numerals.

This teaching toy includes a floor mat divided into a rectangular array of squares which are designated by letters corresponding to the notes of the musical scale. When a child steps on a particular square on the mat, he then bears the musical tone represented by the letter displayed on the square. Associated with the mat is a seven-segment visual display which presents the number of the tone on the scale then being played. Thus a child playing with this educational toy is taught the notes of the musical scale and their counterpart letters and numbers.

However, the toy disclosed in this British patent which includes a foot-operated mat has a serious drawback in that it does not simulate a typical musical instrument having a keyboard. Hence the British toy does not prepare the child to learn how to play a conventional keyboard instrument.

This drawback is overcome in the keyboard operated musical instrument disclosed in U.S. Pat. No. 4,733,591 to Kanebo et al. in which the instrument includes a keyboard circuit for generating a pitch data signal which designates the note name of a musical tone to be produced and a speech signal generator for generating a speech signal which tells in a human voice the name of the designated musical tone. Also, included is a multiplexed processing circuit for time-divisionally processing the pitch data signal and the speech signal; and a sound signal-producing circuit for producing both the musical tone and the sounds of a human voice in accordance with the processed output from the processing circuit. Thus the instrument speaks the names of the tones as it produces the musical tones.

Inasmuch as a music-teaching instrument in accordance with the invention require tone and speech generators, and other circuits similar to those included in the Kanebo et al. patent, the entire disclosure of this patent is incorporated herein by reference.

The practical drawback of a music-teaching instrument of the type disclosed in the Kanebo et al. patent is that for purposes of teaching a musical scale to a pre-school child, it lacks an essential component of the teaching process; namely, the active participation of a teacher or a surrogate therefor.

Basic information on an elementary level such as Arabic numerals and the letters of the alphabet cannot be self-taught by a pre-school child, even though it is best that he acquire this information before entering the first grade. A pre-school child can only be taught y a parent or kindergarten teacher to whom the child is attentive. One who teaches basic information to a pre-school child need not be human but can take a humanoid form, such as a puppet or miniature figure. The advantage of an animated figure in the role of a teacher is that it converts the learning process into a play experience and thereby sustains the interest of the child.

Thus the most successful TV educational program for pre-school children in the MUPPETS in which manipulated puppets teach young viewers of his popular program the letters of the alphabet as well as the numbers, one-at-a-time by means of counterparts. Thus to teach the number 3, the number is displayed by the puppet in its Arabic number form it is spoken by the puppet and also is demonstrated in the form of three blocks and by other trios. In this way, the child is not only taught what number 3 looks like and how it sounds but also metaphorically what it means.

The use of puppets as a means to teach children foreign languages is disclosed in the periodical Puppetry in Practice (Fall 1999 edition) published by the School of Education, Brooklyn College CUNY. An instrument in accordance with the invention is adapted to teach children the language of music, this being carried out by a gang of puppets, each puppet being assigned the task of teaching a single note in the musical scale.

In a music teaching instrument for a preschool child in accordance with the invention, a child will not only hear the tones of the musical scale but will also be made to recognize that the pitch of each tone increases progressively as one goes up the scale. This progressive increase is expressed by alphabetical and numerical counterparts as well as by changes in color.

By preschool children is meant those in the range of 2 to 6 years of age. The instrument shown in FIG. 6, generally identified by numeral 150, is provided with a sound system that may be similar to that included in the system shown in FIGS. 1 and 2. It therefore may include a sound chip, a microprocessor and other electronic circuits necessary to generate the spoken sounds and musical tones produced by the instrument when its keys are activated. Or the sound system may be of the type disclosed in the above-identified Kanebo et al. patent.

Figure 6:
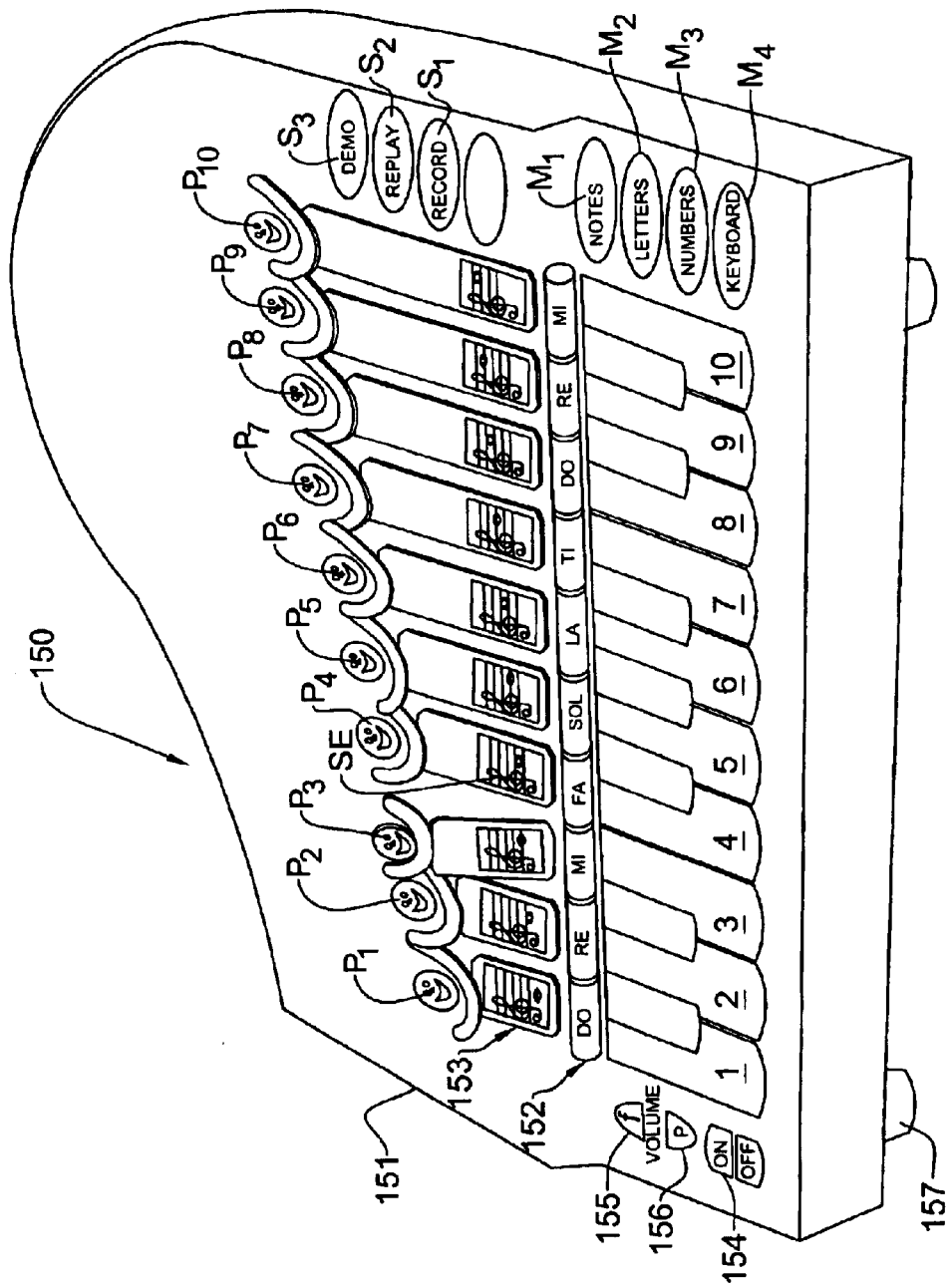
FIG. 6 is a perspective view of another embodiment of a music teaching device for pre-school children.

However the format of the instrument shown in FIG. 6 differs from that shown in FIG. 1 in that it resembles in appearance a keyboard-operated piano that not only produces the tones of the musical scale but also four different counterparts thereto. The collective effect of accompanying each tone with four counterparts is to greatly enhance the ability of the child playing the instrument to recognize and long remember the tones of the musical scale.

Instrument 150 is housed in a molded, high-strength plastic case casing 151 having a piano-like shape. On the flat horizontal face of the casing adjacent the planar front side thereof is a keyboard having a row of ten keys identified by numbers 1 to 8, followed by numbers 2 and 3. The keys numbered 1 to 8 represent the eight tones of a musical octave composed of the tones DO-RE-MI-FA-SOL-LA-TI-DO. The following two keys 2 and 3 represent the beginning of the next octave. Hence the tones produced by successively operating the, keys are of progressively higher pitch.

Directly above the row of keys on the keyboard is a row 152 formed by a series of cylindrical signs which identify the tones (DO,RE,MI, etc.) generated when the keys are activated. The sign row 152 not only identifies the tones in the scale but also creates a barrier between the keyboard and a row 153 of two-dimensional humanoid figures $P_1$ to $P_{10}$ behind the barrier and parallel to the keyboard. Figures $P_1$ to $P_{10}$ in row 153 are puppet-like, each figure being aligned with a respective key on the keyboard. The two-dimensional puppets $P_1$ to $P_{10}$ are of progressively greater length or height corresponding to the increasing pitch of the tones produced when the keys are successively actuated.

Each puppet has printed on its torso a staff ST displaying the staff position of the tone represented by the puppet. The puppets in the row are normally retracted to lie flat on the horizontal face of the instrument casing. But when a key is actuated to produce a tone in the musical scale, the related puppet then stands up to face the player and to make it appear that the tone is coming from him. Thus each puppet functions as a virtual teacher whose subject is limited to a respective tone in the scale and the counterparts thereto.

The puppets are hingedly mounted and are spring biased so that they normally are retracted to lie flat on the casing. The mechanism for erecting each puppet can be an electro-magnetic actuator which is energized by a key switching action, the actuator serving to swing the puppet upwardly to an erect position.

Housed within the casing of the instrument is a sound system that includes a memory in which is digitally stored (a) the tones of the musical scale related to the ten keys on the keyboard, (b) the spoken speech sounds of the alphabetical letters related to these tones, and (c) the spoken speech sounds of the Arabic numerals related to these tones.

Preferably the recorded tones and the spoken sounds of the numbers and letters are derived from the singing and speaking voice of a music teacher. As previously explained, an effective teaching process for pre-school children depends on there being a virtual or surrogate teacher. Hence what the child hears when playing the instrument is the voice of his teacher-puppet the higher the pitch of the tone, the taller is its teacher.

In order to make it seem that the voice is coming from a puppet the loudspeaker of the system is mounted at the bottom of the instrument casing which is raised above the table by short legs 157, so that the sound then actually emanates from below the puppet. The underside of casing 151 serves as the baffle board for the speaker.

The sound of a human voice produced when a key is operated, whether the sound is a tone in the musical scale, a spoken number or a spoken letter, depends on the operating mode of t intent. This is selectively determined by mode switch buttons M1, M2 and M3. When button M1 is pressed by the player, the instrument then operates in a NOTES mode. In this mode, when a key is actuated, this causes the sound system to extract from its memory and then reproduce a particular tone in the scale. Thus when key 3 is actuated by a player, puppet P3 then stands up and sings out the tone M1. But when key 5 is pressed, puppet P5 is raised to sing the tone Sol.

When mode switch M2 is operated, it puts the instrument in its LETTERS mode. Hence each time a key is actuated by the player, he hears the voice of the puppet who then stands up speaking the letter related to this key. Thus if the player actuates key 5, the player then hears the puppet say the letter G representing the tone La. When mode switch M3 is operated to put the instrument in the Numbers mode, then when say key 4 is pressed, one hears the raised puppet P4 speak the number 4 representing the note Fa.

The instrument is color-coded, each key and its related puppet having the same color which depends on the position of the corresponding tone in the musical scale. For example, the colors may be in the following spectrum;

KEY 1—RED
KEY 2—LIGHT GREEN
KEY 3—GREEN
KEY 4—YELLOW
KEY 5—BLUE
KEY 6—ORANGE
KEY 7—PURPLE

The note signs in row 152 are correspondingly colored. Thus the child is taught by the instrument to understand that each tone in the musical scale is distinctive, just as colors related thereto are distinctive.

The instrument includes a volume control 155 to raise the volume to a "Forte" level, and a volume control 156 to lower the volume to a "Pianissimo level". And it is provided with an On-Off switch 154.

When the child simply wishes to play the instrument in the manner of a conventional electronic instrument, he then presses button M4 to put the instrument in a KEYBOARD mode. In this mode, the keyboard is associated with a sound card whereby operation of the keys then produces the tones of an organ or other keyboard instrument. If now the player wishes to record what he is playing in the KEYBOARD mode, he then actuates RECORD switch S1. The system then proceeds to record whatever is then being played by the child. To replay the tune or whatever else the child has recorded, one then presses REPLAY switch S2.

Also stored in the instrument are existing multi-track musical recordings for pre-school children, such as simple tunes and songs. To hear these recordings, one presses the DEMO switch button S3. In the DEMO mode, the keys on the keyboard then function as a selector for the recorded sound tracks.

The table illustrated in FIG. 7 exhibits the multifaceted character of the music teaching instrument. The top row R1 of the table identifies the series of tones (Do, Re, etc.)

produced by the ten keys of the keyboard. Row R2 identifies the corresponding alphabetical letters. In Row R3 we see the corresponding numerals, while R4 identifies the distinctive colors associated with the notes. And in Row R5 we see represented the different pitches of the notes expressed in terms of the varying height sizes of the puppets associated with the notes.

Thus the pre-school child who plays this instrument by means of its keyboard is able to produce the tones of the music scale, each tone being expressed by four different counterparts which collectively function to impress the tones on the child's memory. And because the task of teaching each tone to the child is assigned to a teacher-puppet whose voice sings the tones and speaks the numerals and letters, this serves to sustain the child's interest in being taught the tones of the musical scale.

In practice, instead of switching from a tone to a letter and then to a number, the system may be arranged so that when a key is pressed, then one hears the related tone followed by its letter and then by its number.

Modifications: Instead of providing in an instrument of the type shown in FIG. 6 a gang of two-dimensional puppets hinged to a horizontal panel the puppets normally lying flat and swinging to an erect position when the corresponding keys are actuated, the puppets may be in a jack-in-the-box arrangement.

In this arrangement, each puppet in an erect position is concealed in a box placed below the top panel and closed by a lid. When a key is pressed, the lid or trap door of the box containing the corresponding puppet is caused to swing open to release the puppet which now rises out of the box. But when the key is released, then after a predetermined interval, the puppet is pulled back into its box.

To simplify the instrument and avoid the need for mechanisms for erecting and retracting the puppets and the danger of an erect puppet being broken off, the puppets in the gang may be in an array affixed to an upwardly inclined platform; hence all of the puppets can be seen and are never concealed or retracted. But they are normally inactive.

In order to activate these puppets in response to the keys on the keyboard, a lighting system is provided which when a particular key is pressed is causes the corresponding puppet to light up and glow in a color corresponding to the color of the pressed key.

To this end, the puppets are molded in acrylic plastic or similar highly transparent material having good light transmitting characteristics which lends itself to edge-lighting. Associated with the lower edge of each two-dimensional puppet is a light bulb which when turned on illuminates the entire puppet.

Interposed between the edge of the plastic puppet and the bulb is a color filter which imparts to the rays emanating from the bulb the same hue as the color of the corresponding key. Hence when the red key is depressed, one then sees a puppet glowing in red. And one now hears from this illuminated and active puppet, the tone produced by the key.

As in the other embodiments, the gang of puppets is of progressively increasing height to indicate the increasing pitch of the tones. Again it must be stressed that unique to this instrument for teaching the language of music is that each puppet in the gang teaches a single note in the musical scale and that the color and height of the puppet are associated with this note.

In practice, the keyboard may have more than an octave and a portion of the next octave, as shown in FIG. 6. It may have two or more octaves or even as many octaves as a piano.

An instrument in accordance with the invention may be created by means of an existing music synthesizer computer having a sound card in which is digitally stored the tones of the music scale, and means to t and reproduce these tones. By means of appropriate software, the keyboard and row of puppets shown in FIG. 6 are displayed on the CRT screen of the computer, the computer being arranged so that when a player touches the video screen to engage a key thereon, this causes the related puppet to light up to appear to stand up and then voice the tone related to the actuated key. Thus an existing computer functioning as a music synthesizer can be converted to create as it were, a virtual music teaching intent in accordance with the invention.

Figure 8:
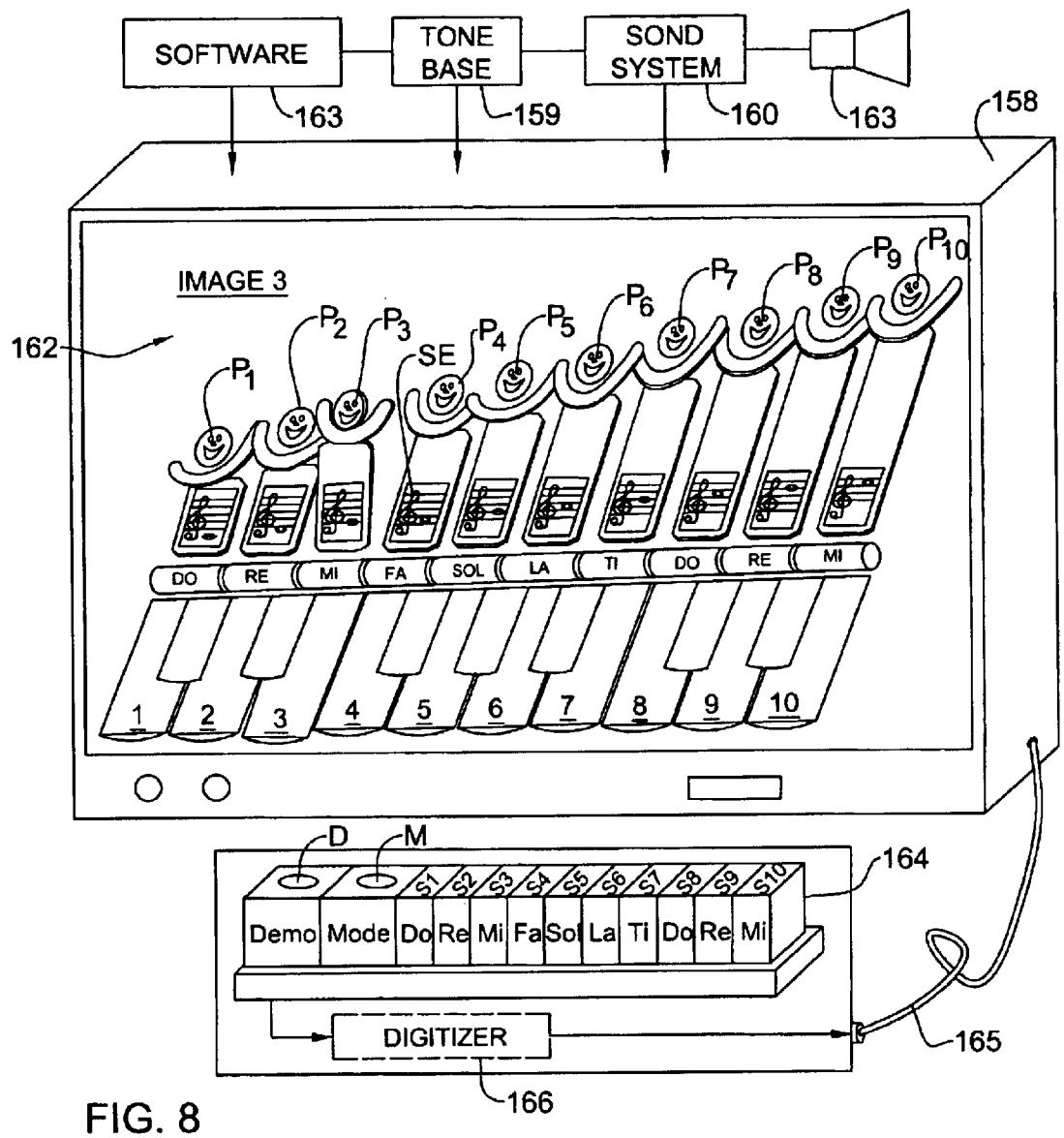
FIG. 8 illustrates a computerized music teaching instrument in accordance with the invention in which a computer is associated with a rote controller.

Computerized Music Teaching Instrument: Referring now to FIG. 8, shown therein is a computerized version of the portable self-sufficient music teaching instrument illustrated in FIG. 6. The computerized version affords a virtual image of the portable instrument, yet carries out similar functions.

For this purpose there is provided a music synthesizer computer 158 such as a computer of the type disclosed in the above-identified Clynes patents. Computer 158 is provided with a tone base 159 and a data base 160.

Digitally stored in tone base 159 which may include a sound card, are the ten tones on a musical scale which the system is capable of playing, as well as simple tunes suitable for pre-school children. These tones and tunes are selectively extracted from tone base 159 and are amplified and reproduced in a sound system 160 whose output is fed to a loudspeaker 161. In practice, there may only be seven tones or a number of tones greater than ten.

Computer 158 is provided with a video screen 162 on which is exhibited an image selected from a series of ten images entered into data base 160 by software 163 or other means and digitally stored therein. These ten images show the keys 1 to 10 of a music instrument keyboard and a corresponding row of puppets P1 to P10 behind the keyboard.

While the graphics of the image shown in FIG. 8 on the screen of the computer resemble those which appear on the portable instrument shown in FIG. 6, it is to be understood that a graphics artist who prepares these images may draw an image that is artistically or ornamentally different from the image illustrated. Thus the puppets P1 to P10 may be shown in other fanciful forms. But they must vary progressively in height to indicate changes in pitch.

The images which appear on the series of stored images differ from each other in only two respects. The Image 1 in the series shows key 1, on the keyboard in a depressed and therefore acted state, all other keys being untouched. And it shows puppet P1 in an erect state, all other puppets being in a reclining sate. In Image 2 in the series, it is key 2 that is shown depressed and puppet P2 that is shown in an erect state. And similar changes must appear in Images 3 to 10. Thus FIG. 8 shows image 3 in which only key 3 is depressed and puppet P3 is raised.

When Image 3 is presented on the screen of the computer, the player then hears the third tone (Mi) in the scale which seems to be emerging from the mouth of the raised puppet P3. The player at the same time sees the number 3 of the note, the name of the note (Mi) and its clef symbol. He also sees the distinctive color of the then erect puppet which is indicative of the $3^{rd}$ note in the musical scale. And the player also sees the relative height of the raised puppet, this being indicative of the pitch of tone Mi.

This multiform aural and visual metaphorical presentation of each tone in the musical scale is calculated to make a far stronger mnemonic impression on the player than the effect made by a tone standing alone. In computer technology, a mnemonic operation code is one in which the names of various operations are abbreviated and expressed mnemonically to facilitate remembering the operations they represent. In the context of a computerized music teaching instrument in accordance with the invention, a multiple mnemonic code is provided to impress on die memory of the player the tones of a musical scale.

A player of the computerized instrument shown in FIG. 8 cannot directly manipulate the keys of the keyboard which appear on the screen of the computer. To in effect manipulate these keys, it is necessary to provide a remote controller such as keypad 164 shown in FIG. 8 which is coupled by a cable 165 to computer 158 to deliver digital signals thereto for manipulating the virtual keys of the keyboard. In practice the remote controller need not be wired to the computer but may be linked thereto by wireless transmission such as by microwave in the manner of a cell phone, or by infrared in the manner of a TV set controller.

Keypad 164 is provided with a row of key-actuated switches S1 to S10, a Mode Switch M and a Demo switch D. Associated with keypad 164 is an electronic digitizer 166 which converts the switching action effected by actuating one of switches (S1 to S10) into a digital signal whose binary value represents the switch that is actuated, the signal being conveyed by cable 165 to the computer. Thus when, switch S3 is actuated, the digital signal represents this number.

Mode switch M is a selector having four operative positions corresponding to button switches M1, M2, M3 and M4 shown in FIG. 6. At position M1, the computerized instrument then functions in a NOTES mode in which as the keys are abed one hears the tones of a musical scale. At position M2, the instrument then functions in a LETTERS mode so that when the keys are actuated, the selected puppets voice the letters which represent the tones of the scale. At position M3, the instrument is then operative in a NUMBERS mode so that when the keys are actuated, what is voiced by the puppets are the numbers corresponding to the notes being played. When at position M4, the instrument is in its KEYBOARD mode, then when the keys are actuated by a player, one hears not tones as sung by a singer but those produced by a keyboard instrument such as an organ.

Operation of the DEMO switch causes the keys to then extract from the tone base a recorded tune or song, each key ac on then selecting a different song or tune. The computer then acts as if it were operating in conjunction with a multi-track record, recording.

Electronic digitizer 166 is adapted to convert the mechanical switching actions of keypad switches S1 to S10 into a digital signal whose binary value is indicative of the S number of the actuated switch. When therefore this signal is entered into the computer, it will cause the computer to extract from its data base and present on its screen that image which shows a depressed key on the virtual keyboard whose number corresponds to the S number of the actuated switch on controller 164.

Digitizer 166 also generates digital signals which represent the several switch positions of Mode switch M and Demo switch D so that the computerized system is capable of performing the same functions as that of the portable instrument shown in FIG. 6.

It is to be noted that the controller need not be in the straight line format shown in FIG. 8 but may resemble a TV set remote controller in which the numbered switch buttons are in a rectangular array. A preferred form of wireless remote controller is shown in FIG. 9 in which the controller 167 is a self sufficient keyboard resembling a piano keyboard housed in a rectangular box-like case 168.

However, the keys 1 to 10 of this keyboard act, when depressed, to actuate a switch in the same manner as the switching keypad shown in FIG. 8. The switches of the keyboard are associated with digitizer 166 which is housed in case 168 and serves to convert the switching action into digital values to be entered into the computer to produce the respective tones corresponding to these numbers. The coupling between the remote controller and the computer is preferably wireless such as by infrared or microwave radiation.

Figure 9:
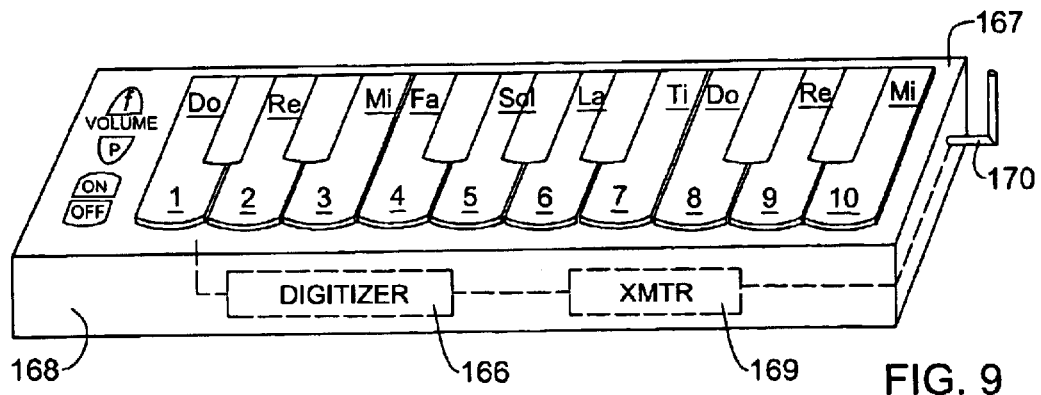
FIG. 9 shows a preferred form of remote controller.

In the remote controller shown in FIG. 9, the output of digitizer 166 is fed to a microwave transmitter 169 whose output is applied to a microwave antenna 170. The remote controller is battery operated. Since the signals transmitted from the controller are picked up by a nearby computer whose screen is visible to the player operating the remote controller, the power requirements of this controller are quite low.

The Language of Music: Language has been defined as, "A systematic means of communicating ideas or feelings by the use of conventionalized sounds, gestures or marks having understood meanings."

The language of prose which communicates ideas makes use of the letters of the alphabet. And the language of mathematics to express concepts, uses numbers, letters and symbols for this purpose.

Feelings can best be communicated by the language of music which is expressed by the tones of the musical scale. These tones are commonly identified by corresponding mathematical numbers as well as by corresponding left.

In a music teaching instrument in accordance with the invention, a child is taught to identify each tone in the musical scale by its sound and also by corresponding numbers and letters. Hence a child taught by the team of puppets included in the instrument learns to identify each tone in the scale not only by its distinctive sound but also by its number and letter. The instrument therefore functions as a multi-lingual teaching tool.

This multi-lingual knowledge, when acquired by a pre-school child, can serve a useful purpose unrelated to music. Thus it is usual for parents of a pre-school child to insist at the child memorize his home telephone number. Then should the child when carrying no identification, wander away from home and become lost, he can give his home telephone number to a person seeking to help the lost child who can then contact his parents.

A typical pre-school child, while capable of memorizing a telephone number cannot retain the number in his memory for a prolonged period, particularly since the child rarely has occasion to recall his telephone number. But a child, by exploiting the present instrument to memorize his telephone number, would thereafter find it difficult to forget it.

In order for the child to memorize his home telephone number so that it is retained for a prolonged period in his mind, the child has only to enter his telephone number into the computer of the instrument. To do so the child operates the keyboard of the remote controller and presses in sequence the tone keys which bear the series of numbers representing his home telephone number.

The computer records the tones corresponding to the telephone number to produce a short musical phrase. It is this memorable musical phrase representing the telephone number that can be played back repeatedly and memorized by the child.

When therefore the child is asked to give his telephone number, this will cause him to extract from his memory die musical phrase and to translate it in his mind into the series of numbers which constitute his telephone number.

A telephone number is composed in a series of digits selected from the 0 to 9 range. The tone keys on the keyboard of an instrument in accordance with the invention are numbered 1 to 10, the 10 standing for zero.

A typical child can retain in his memory for an indefinite period a musical phrase, whereas his memory would be much shorter for a series of numbers corresponding to the notes of the phrase. The reason for this difference is that a musical phrase has a distinct pattern which is memorized as an entity whereas a series of discrete numbers do not have a memorable pattern.

For example, most individuals will never forget the first four notes of Beethoven's fifth symphony which has a highly memorable pattern, whereas if these four notes were to be converted into a series of numbers, it is unlikely that these numbers would lodge in an individual's memory.

Though an instrument in accordance with the invention has particular value in teaching pre-school children, it is also useful in teaching adults the fundamentals of the musical scale, in which case the instrument can be tailored for this purpose. Thus, the puppets instead of being figures appropriate to a child can be two-dimensional figures of famous composers, such as Bach, Beethoven, Brahms or Mozart in different heights. A Bach puppet is particularly appropriate, for it is a historical act that he taught the language of music to his many children, two of whom became composers of note.

While there have been disclosed preferred embodiments of a music teaching instrument in accordance with the invention, it is to be understood that many changes may be made therein without departing from the spirit of the invention.

What is claimed is:

1. A music synthesizer computer assembly adapted to function as a music teacher, said assembly comprising:
   A. a tone base having digitally stored therein tones of a music scale;
   B. a sound system for reproducing a tone extracted from said tone base;
   C. a computer provided with a data base having digitally stored therein a series of visual images to be presented on a video screen, each visual image exhibiting a virtual keyboard having a row of keys, which correspond to tones of the scale, each of said keys being identified by a name, by a letter and by a number; said visual image further exhibiting a row of miniature figures, each of said figures corresponding to respective tone of the scale, wherein each visual image in the series thereof displaying the virtual keyboard with one of its keys in a depressed state, and the row of figures with the figure corresponding to the depressed key in an erect state, the others figures being in a reclining state, wherein successive visual images in the series thereof showing a further respective key in a depressed state and the figure corresponding to this key in the erect state;
   D. a video screen for presenting a visual image in the series extracted from the data base; and
   E. a remote controller, which is distant from the computer and is capable of communicating therewith, said controller having a real keypad provided with a row of key-actuated switches corresponding to the keys of the virtual keyboard and a digitizer associated therewith to generate a digital signal whose binary value identifies the switch actuated by a player, said digital signal being entered into the computer to cause it to extract from the data base and to display on the video screen the visual image related thereto, said image representing the corresponding key in the depressed state and to extract from the tone base the tone corresponding to the actuated switch, wherein said sound system is capable to reproduce the tone whose respective switch is actuated and whose respective key is shown on the video screen in the depressed state and whose corresponding figure is shown on the video screen in the erect state.

2. An instrument as set forth in claim 1, in which the remote controller is linked to the computer by a cable.

3. An assembly as set forth in claim 1, which the controller includes an infrared wave transmitter to convey the digital signals to the computer.

4. An assembly as set forth in claim 1, which the controller includes a microwave transmitter to convey the digital signals to the computer.

5. An assembly as set forth in claim 1, in which stored in the data base and extracted therefrom are the spoken sounds of letters corresponding to the tones of the music scale.

6. An assembly as set forth in claim 1, in which stored in the tone base and extracted therefrom are spoken sounds of numbers corresponding to the tones of the scale.

7. An assembly as set forth in claim 1, wherein the figures in the row of figures have distinctive colors each representing a respective tone in the scale.

8. An assembly as set forth in claim 1, in which the figures in the row are of progressively increasing height in accordance with progressively higher pitches in the tones of the scale.

9. An assembly as set forth in claim 1, in which the figures are two-dimensional and those in the reclining state lie flat on a horizontal surface.

10. An assembly as set forth in claim 1, which is operative on a keyboard mode in which it can then play tunes stored in the tone base or to play a tune composed by the player using the tones stored in the tone base.

11. An assembly as set forth in claim 10, including means to record tones produced by the player when playing a tune in the keyboard mode, and to replay the recorded tone.

12. An assembly as set forth in claim 1, in which the tones stored in the tone base are tones sung by a singer.

13. An assembly as set forth in claim 1, in which stored in the tone base are the following sounds:
   (a) audible tones of the musical scale;
   (b) spoken sounds of letters corresponding to the tones of the scale;
   (c) spoken sounds of numbers corresponding to the tunes of the scale;
      said controller having switch means when actuated generate digital signals to extract from the data case sounds (a), (b) or (c).

14. An assembly as set forth in claim 1, in which the row of figures in the visual image is parallel to the row of keys on the virtual keyboard and the figures are equal in number with the keys.

15. An assembly as in claim 1 in which the keypad in the remote controller includes a series of keys in a piano keyboard format, each key of which is associated with a switch whereby the switch is actuated when the key is depressed.

* * * * *